No. 673,222. Patented Apr. 30, 1901.
A. REUTERDAHL.
STORAGE BATTERY.
(Application filed Aug. 9, 1900.)
(No Model.)
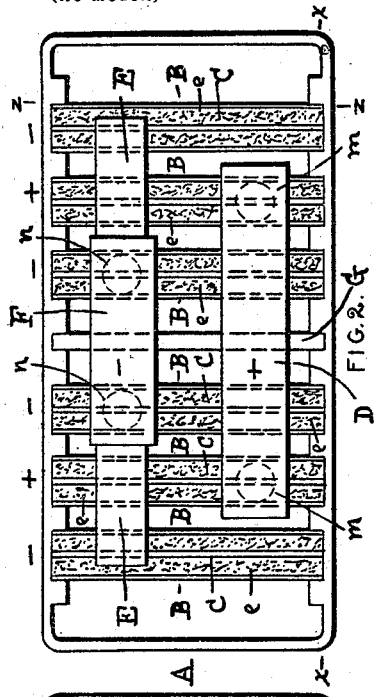
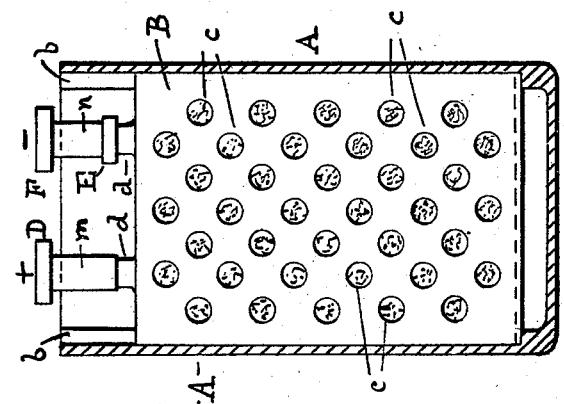
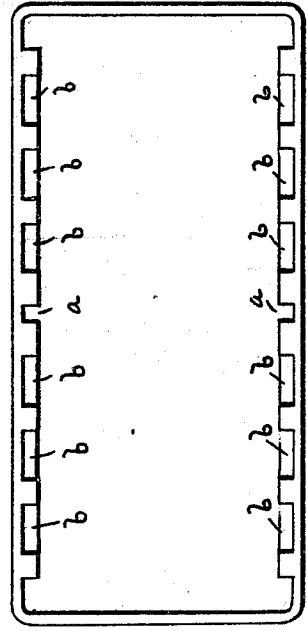
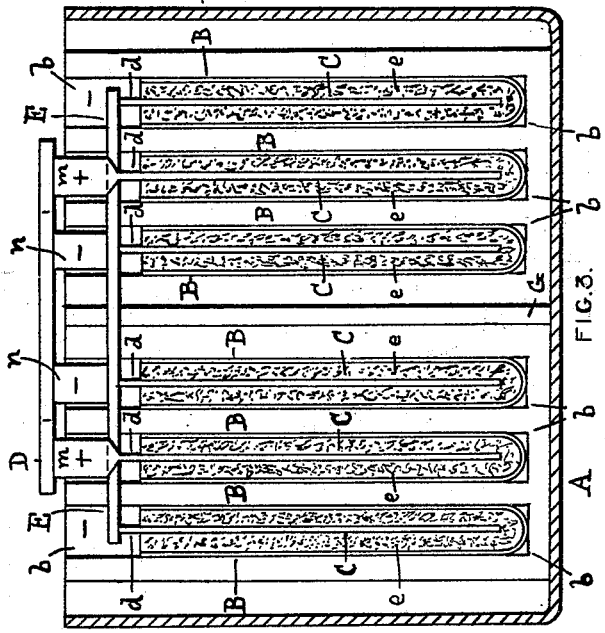
WITNESSES.
Annie E. Perce.
Mabel Foster.
INVENTOR.
Arvid Reuterdahl
BY Warren R. Perce
ATTORNEY.

UNITED STATES PATENT OFFICE.

ARVID REUTERDAHL, OF PROVIDENCE, RHODE ISLAND, ASSIGNOR TO REUTERDAHL ELECTRIC COMPANY, OF SACO, MAINE.

STORAGE BATTERY.

SPECIFICATION forming part of Letters Patent No. 673,222, dated April 30, 1901.

Application filed August 9, 1900. Serial No. 26,386. (No model.)

*To all whom it may concern:*

Be it known that I, ARVID REUTERDAHL, a citizen of the United States, residing at Providence, in the county of Providence and State of Rhode Island, have invented certain new and useful Improvements in Storage Batteries, of which the following is a specification, reference being had therein to the accompanying drawings.

My invention relates to storage batteries for the accumulation and distribution of electricity, and is an improvement on the device shown and described in Letters Patent of the United States No. 653,883, issued to me and dated July 17, 1900.

It consists of the novel construction, arrangement, and combination of the several parts, as hereinafter particularly described, and as specifically set forth in the claims.

In the accompanying drawings like letters indicate like parts.

Figure 1 is a top plan view of the grooved jar or retaining vessel to contain and hold the electrodes in position. Fig. 2 is a top plan view of my improved storage battery. Fig. 3 is a view of the same as seen partly in section on line $x$ $x$ of Fig. 2 and partly in elevation on said line. Fig. 4 is a view of said storage battery as seen partly in section on line $z$ $z$ of Fig. 2 and partly in elevation on said line.

In the drawings, A represents a retaining-jar, made of rubber, glass, or other suitable material. This jar is provided with vertical grooves $a$ $b$, as best shown in Fig. 1. The grooves $a$ are made half-way the length of the jar and extend to the bottom of the jar. The grooves $b$ extend nearly to the bottom of the jar, as plainly illustrated in Fig. 4, and those on one side of the jar are directly opposite those on the other side of the jar, as seen in Fig. 1. In each pair of oppositely-arranged grooves $b$ is mounted an electrode or composite plate. Each electrode or composite plate consists of a flexible elastic sheet B, of hard rubber, celluloid, or other suitable acid-proof material, bent into a U-shaped form, with open ends, as shown in Fig. 4, thus constituting a double holding-plate. This double holding-plate or sheet is perforated in a series of small and numerous holes $c$. A conductor C has a projection or connector $d$ from one of the upper corners thereof. This conductor C is shorter vertically than the double holding-plates or bent sheet B and is inserted therein equidistant from the inner vertical surfaces of said plates or sheet B, as seen in Figs. 2 and 3. The active material $e$ is contained in said flexible and perforated plates or bent sheet B, and the whole of the inserted portion of the conductor C is embedded in said active material, which is in direct contact with the conductor C throughout the entire extent of said embedded portion thereof.

The conductor C is made of lead or other material capable of conducting electricity. It may be provided with pockets, corrugations, or other holding means for the reception of the active material, as may be preferred, or it may be a plane sheet of lead and may be in any desired form or shape. In Figs. 2 and 3 I show a multiple storage battery having two couples, each of which consists of two negative (outer) electrodes or composite plates and one positive (inner) electrode or composite plate. The two positive electrodes are connected by a bus-bar D, made of lead or other suitable material. The bus-bar D has two lugs $m$ projecting from the under side thereof, which are placed in contact, respectively, with the connectors $d$ of the conductors C of the two positive electrodes, as shown in Figs. 2 and 3. The two negative electrodes of each couple are connected by a similar bus-bar E in contact with the connectors $d$ of the conductors C thereof. A bar F has two lugs $n$ projecting from its under side, which are in contact with the connectors $d$ of the conductors C of those negative electrodes which are nearest each other, as shown in Figs. 2 and 3.

Any active material suitable for storage batteries may be used; but I prefer for the negative composite plates pure and granular electrolytic lead, and for the positive composite plates peroxid of lead, spread in the form of a thick paste upon the conducting-plate, first on one side in direct contact therewith throughout the whole extent of its surface, and when that has dried and hardened the conducting-plate is turned over and a similar coating is spread upon the side of the conducting-plate then uppermost, in direct contact therewith throughout the whole extent of its surface and then dried and hardened. The result is that the conducting-plate is firmly embedded in the active material, and the entire superficial area of its embedded portion is in direct contact with the active material. The couples may be grouped in a series, if desired, by means of suitable couplers or bus-bars. I have shown in the drawings a multiple or parallel grouping of couples; but this is not an essential feature of the invention, which relates rather to the manner of constructing the composite plate and supporting it in position in a jar or retaining device. In case two couples are contained in one jar a partition G, inserted in the grooves $a$, divides the cells from each other.

While in the drawings I show the flexible holding-plates as bent in a U shape and integral throughout, yet it is obvious that two separate holding-plates may be used and arranged parallel with each other and provided with a bottom strip, or their lower edges may rest upon the bottom of the jar or other receptacle.

In the device as illustrated in the drawings the lower corners of the bent holding-plates are in contact with and supported by the bottom of the grooves $b$, Fig. 4, and thus there is an open space provided for the acid between the bottom of the composite plates and the bottom of the jar.

By inserting in the grooves of the retaining-jar the composite plates shown the open ends of said plates are received in said grooves and thereby closed, and the insertion of said open ends of the holding-plates in said grooves serves to bind the active material against the conducting-plate. In this manner the active material is supported at all points, on the front and back by the perforated flexible holding-plates B and at the two ends by the grooves of the jar itself. It is evident that by this construction the weight of a storage battery is reduced to a minimum and the disadvantages commonly experienced in storage batteries are avoided. The plates are held securely and cannot come into contact by rough usage. Short-circuits cannot be formed, nor buckling or warping action occur. The active material cannot cleave or fall away from its supports, but is held in position by elastic holding pieces or plates, which yield to the inequalities of action or condition or any uneven expansion of the mass of the active material.

I claim as a novel and useful invention and desire to secure by Letters Patent—

1. In a storage battery, the combination of a jar having therein oppositely-arranged parallel grooves and a composite plate inserted in and supported by said grooves, and consisting of a flexible and perforated sheet or plate, of a material which is a non-conductor of electricity, bent into a U shape, a mass of active material contained in said bent sheet or plate, and a conducting-plate embedded in said mass of active material and having the entire superficial area of its embedded portion in contact with said active material, the said active material being held against the conducting-plate by means of the insertion of the ends of said bent sheet or plate in said grooves, substantially as specified.

2. In a storage battery, the combination of a jar having therein oppositely-arranged, parallel grooves, a plurality of composite plates, alternately positive and negative, inserted in and supported by said grooves, respectively, and each consisting of a flexible, perforated sheet or plate of a material which is a non-conductor of electricity, bent into a U shape, a mass of active material contained in said bent sheet or plate, and a conducting-plate embedded in said mass of active material and having the entire superficial area of its embedded portion in contact with the active material, the said active material being held against the conducting-plate by means of the insertion of the ends of said bent sheet or plate in said grooves, means of connecting the positive conducting-plates and means of connecting the negative conducting-plates, substantially as described.

3. In a storage battery, the combination of a jar having therein oppositely-arranged, parallel grooves and a composite plate consisting of a flexible, perforated sheet or plate of a material which is not a conductor of electricity, bent into a U shape with open ends, which bent sheet or plate is inserted in said grooves in such manner that the three sides of the grooves receive and close the open ends, respectively, of said bent sheet or plate, a mass of active material contained in said bent sheet or plate and a conducting-plate embedded in said mass of active material and having the entire superficial area of its embedded portion in contact with said active material, the said active material being held against the conducting-plate by means of the closure of the open ends of the bent sheet or plate in said grooves, substantially as shown.

4. In a storage battery, the combination of a jar having therein oppositely-arranged parallel grooves, and a plurality of composite plates, alternately positive and negative, each consisting of a flexible, perforated sheet or plate of a material which is a non-conductor of electricity, bent into a U shape with open ends, which bent sheet or plate is inserted in said grooves in such manner that the three sides of the grooves, respectively, receive and close the open ends of said bent sheet or plate, a mass of active material contained in said bent sheet or plate, a conducting-plate embedded in said mass of active material and having the entire superficial area of its embedded portion in contact with the active material, the said active material being held against the conducting-plate by means of the closure of the open ends of the bent sheet or plate, in said groove, means of connecting the positive conducting-plates and means of connecting the negative conducting-plates, substantially as set forth.

5. In a storage battery, the combination of a jar having therein oppositely-arranged, parallel grooves and two oppositely-arranged central grooves parallel to the first-named grooves, a partition in said jar mounted in said two central grooves and dividing the jar into two compartments, a couple in each compartment consisting of one positive and two negative composite plates, each comprising a flexible, perforated sheet or plate of a material which is a non-conductor of electricity, bent into a U shape, and inserted in and supported by the first-mentioned grooves, respectively, a mass of active material contained in said bent sheet or plate, a conducting-plate extending into said mass of active material within said bent sheet or plate, a connector projecting from the top of each conducting-plate, a bus-bar having two lugs which are respectively in contact with the connectors of the conducting-plates of the two positive composite plates, a bus-bar in contact with the connectors of the two conducting-plates of the two negative composite plates of each couple, a bar having two lugs which are in contact, respectively, with the two last-named bus-bars, respectively, the said active material being held against the conducting-plate by means of the insertion of the ends of said bent sheet or plate in the adjacent grooves of the jar aforesaid, substantially as specified.

In testimony whereof I affix my signature in presence of two witnesses.

ARVID REUTERDAHL.

Witnesses:
ARTHUR P. JOHNSON,
HOWARD A. LAMPREY.